Patented Nov. 6, 1923.

1,473,259

UNITED STATES PATENT OFFICE.

CARL SUNDSTROM AND GEORGE N. TERZIEV, OF SYRACUSE, NEW YORK, ASSIGNORS TO THE SOLVAY PROCESS COMPANY, OF SOLVAY, NEW YORK, A CORPORATION OF NEW YORK.

PROCESS OF FORMING SODIUM COMPOUNDS.

No Drawing.    Application filed November 15, 1922.    Serial No. 601,158.

*To all whom it may concern:*

Be it known that we, CARL SUNDSTROM and GEORGE N. TERZIEV, citizens of the United States, residing at Syracuse, in the county of Onondaga and State of New York, have invented a new and Improved Process of Forming Sodium Compounds, of which the following is a specification.

It has recently been discovered that if sodium bicarbonate be heated at a temperature below that required to convert it into sodium carbonate a sodium compound, intermediate between sodium bicarbonate and sodium carbonate, having the formula $Na_2CO_3.3NaHCO_3$ and the physical form of fine needle-like crystals is formed. Our invention relates to the production of this compound and the object of our improvements is to provide for its efficient and convenient formation on a commercial scale.

Heretofore the compound $Na_2CO_3.3NaHCO_3$ has been made by heating sodium bicarbonate alone at a temperature below that required to produce sodium carbonate, i. e., at a temperature approximating 100° C.

We have found however, that if, before heating, there be mixed with the sodium bicarbonate a sodium carbonate compound so as to form a mixture in which the proportion of $CO_2$ to $Na_2O$ is at least equal to that in the compound $Na_2CO_3.3NaHCO_3$, the reaction takes place readily and the product can be obtained in a state of relatively great purity. The desired product may still be formed even though the proportion of $CO_2$ is somewhat less than that indicated above, but the product will be of a lesser degree of purity and its formation will cease if the proportion of $CO_2$ be too far reduced. Preferably, in commercial manufacture, we mix with the crude sodium bicarbonate of the ammonia soda process ($NaHCO_3$ + 12–15% moisture content) sodium carbonate ($Na_2CO_3$) in approximately theoretical proportions to form the desired compound.

We have also demonstrated by experiment that other sodium carbonate compounds such as the monohydrate or decahydrate or mixtures of all three, may be employed with the bicarbonate.

In any case the mixture should have some water content. When crude bicarbonate is used its water content (12–15 per cent) is sufficient for the mixture, and for this reason we preferably employ crude bicarbonate in carrying out the process.

In case however, the other sodium carbonate compound employed, as monohydrate ($Na_2CO_3.H_2O$) or decahydrate ($Na_2CO_3.10H_2O$) has a sufficient water content, then a refined or dried bicarbonate can be employed.

Water in quantity sufficient to give a substantial amount of liquid or solution during the reaction should, however, be avoided. Under certain conditions some mother liquor may be present at the end of the reaction which, when the reaction temperature is about 100° C. will have substantially the following average composition per 100 grams.

| $Na_2CO_3$ | $NaHCO_3$ | $H_2O$ |
|---|---|---|
| 21. grams | 9. grams | 70. grams |

After the mixture is formed it is heated in any suitable or convenient manner until the desired reaction is effected, care being taken that the temperature does not become sufficiently high to break down the formed product and form sodium carbonate. Preferably we employ a temperature of between 95° C. and 100° C. At this temperature the reaction proceeds rapidly. The compound $Na_2CO_3.3NaHCO_3$ will be formed at a lower temperature but more slowly than at that indicated.

The heating may be effected by any suitable or convenient means as by applying heat to the exterior of a rotary furnace through which the mixture is passed.

When in the claims we speak of the compound $Na_2CO_3.3NaHCO_3$ we mean the substance discovered by Herbert Edwin Cocksedge and described in his application for United States Letters Patent, Serial No. 598,020, and which is characterized by its fine needle-like crystal form and by its refractive indices of α about 1.435 and γ about 1.526.

Having thus described our invention what we claim as new and desire to secure by Letters Patent is:

1. The process of forming a sodium compound having the formula $Na_2CO_3.3NaHCO_3$ which consists in forming a mixture of sodium bicarbonate and a sodium carbonate compound in which mixture the proportion of $CO_2$ to $Na_2O$ is at least equal to that in said compound and heating the mixture at a temperature below that required to convert the sodium bicarbonate into sodium carbonate.

2. The process of forming a sodium compound having the formula $Na_2CO_3.3NaHCO_3$ which consists in mixing together crude sodium bicarbonate of the ammonia soda process and sodium carbonate and heating the mixture at a temperature not exceeding 100° C.

3. The process of forming a sodium compound having the formula $Na_2CO_3.3NaHCO_3$ which consists in mixing together crude sodium bicarbonate of the ammonia soda process and sodium carbonate and heating the mixture at a temperature below that required to convert the sodium bicarbonate into sodium carbonate.

4. The hereinbefore described process which consists in heating a mixture of sodium bicarbonate and a sodium carbonate compound at a temperature not substantially exceeding 100° C. so as to form a sodium compound having the formula $Na_2CO_3.3NaHCO_3$.

5. The hereinbefore described process which consists in heating a mixture of sodium bicarbonate and a sodium carbonate compound at a temperature between 95° C. and 100° C. so as to form a sodium compound having the formula $Na_2CO_3.3NaHCO_3$.

6. The process of forming the compound represented by the formula $Na_2CO_3.3NaHCO_3$ which consists in heating a mixture of sodium bicarbonate and a sodium carbonate compound for a time and at a temperature insufficient to convert the sodium bicarbonate into sodium carbonate.

In testimony whereof we affix our signatures, this 10th day of November 1922.

CARL SUNDSTROM.
GEORGE N. TERZIEV.